United States Patent [19]

Friggstad

[11] Patent Number: 4,676,321
[45] Date of Patent: Jun. 30, 1987

[54] FRAMEWORK FOR GROUND WORKING IMPLEMENT

[75] Inventor: Terrance Friggstad, Saskatoon, Canada

[73] Assignee: Flexi-Coil Limited, Saskatoon, Canada

[21] Appl. No.: 799,832

[22] Filed: Nov. 20, 1985

[51] Int. Cl.$^4$ ............................................. A01B 73/04
[52] U.S. Cl. ................................... 172/776; 172/310; 172/311; 172/323; 172/622
[58] Field of Search ............... 172/310, 311, 322, 323, 172/397, 398, 400, 401, 615, 616, 617, 620, 622, 634, 635, 636, 639, 657, 658, 675, 764, 776; 280/411 R, 411 A

[56] References Cited

U.S. PATENT DOCUMENTS

| | | | |
|---|---|---|---|
| 3,043,377 | 7/1962 | Urben | 172/657 X |
| 4,105,077 | 8/1978 | Seifert, Jr. | 172/629 X |
| 4,186,805 | 2/1980 | Repski | 172/310 X |

FOREIGN PATENT DOCUMENTS

| | | | |
|---|---|---|---|
| 350243 | 10/1905 | France | 172/398 |
| 1287290 | 1/1962 | France | 172/662 |

Primary Examiner—Richard T. Stouffer
Attorney, Agent, or Firm—D. Ron Morrison

[57] ABSTRACT

A ground working implement is disclosed, having a multiplicity of ground working tools mounted on a set of rigid bars which are maintained in substantially parallel relative position by pairs of rigid links flexibly fastened to the pairs of the rigid bars, with hydraulic cylinders attached diagonally between rigid links to control the elevation above ground of the rigid bars which are supported on normally parallel wheel axles mounted below and in front of the individual rigid bars. Operation of the hydraulic cylinders enables variation in the ground penetration of tools mounted on and beneath the rigid bars as the implement is drawn over the ground.

7 Claims, 5 Drawing Figures

FRAMEWORK FOR GROUND WORKING IMPLEMENT

This invention relates to ground-working implements, more particularly ground-working agricultural implements, and more specifically is directed to a framework for mounting a variety of ground-working tools for purposes of, for examples, tilling, cultivating, fertilizing, or seeding the soil.

Conventionally, when a multiplicity of ground-working tools is to be operated simultaneously by being pulled by a tractor across the surface of the soil, the tools are mounted under and on one or a small number of rigid frame planes that are supported by wheels within the boundaries of the respective planes and stabilized by stabilizing wheels travelling well ahead of the planes, or stabilized by rigid connection of the planes to the tractor hitch. However, problems arise on uneven terrain, when the slope of the ground surface under the plane of the ground-working tools is different from the slope of the ground surface that the relevant stabilizing wheel or the tractor is passing over. Under such conditions, the pitch of the rigid plane of the ground-working tools, in the direction of motion of the tools (i.e. the pitch front-to-back), does not correspond to the pitch of the ground directly beneath the plane; as a result, There are unwanted variations and discrepancies in the working depth of the tools, producing uneven tillage, inaccurate seed placement, uneven fertilizer placement, and other conditions inimical to even maximized seed emergence and growth. The best that has been done to alleviate this problem has been to place the stabilizing wheels, which run ahead of the frame, back as close as possible to the frame and to allow the hitch, between tractor and frame, to "float", i.e. to move freely about a horizontal transverse axis. However, the problem of uneven tillage by tools mounted under a rigid plane remains, and has been compounded by the advent of zero-tillage and stubble cropping practices. With these practices, trash and residue on the surface are becoming a major problem for equipment, as more space between the individual ground-working shanks or tools is required to allow the trash and residue to flow through without plugging or bridging between the advancing tools. But, the greater the distance between the tools, the more they are subject to differences in working depth, because they are still mounted on a rigid plane.

In accordance with the present invention, numerous ground-working tools are mounted in at least two parallel ranks, preferably three or more, each rank being fastened beneath an individual rigid bar or bars, the individual bars being mounted respectively on wheels below and slightly in advance of the respective bars and linked flexibly by rigid links, in pairs, so that each bar is capable of "floating" on its supporting wheels to follow the terrain immediately below the bar, independent of the elevation of the adjacent bars, and the pairs of bars, with their corresponding rigid links, form flexible frames having the effective configuration of parallelograms of variable shape; power means, most conveniently in the form of hydraulically powered cylinders, are mounted, as required, generally within the frames at appropriate diagonal angles and points to adjust and control the shapes of the parallelograms or frames. Variation in the shape of the parallelograms not only varies the angle of inclination of the more or less upright sides of the parallelograms, but is adapted also to vary the elevation of the ground working tools relative to the wheels, thereby achieving control of the depth of penetration of the tools into the ground or of their clearance above ground level.

The present invention thus consists in a framework for supporting a multiplicity of ground-working tools of an agricultural implement whereby the tools can be positioned relative to the ground, comprising:

(a) at least two flexibly linked normally parallel rigid bars beneath which the multiplicity of ground-working tools is fastened in parallel ranks;

(b) supporting wheels fastened to each of the bars with the wheel axles spaced below, ahead of, and normally parallel to the respective bars;

(c) pairs of parallel rigid links flexibly linking each bar to another parallel bar and maintaining all the bars in generally parallel spaced relationship; and (d) power means mounted adjacent at least one of the pairs of the parallel links, at an angle to and attached to each of the links of the pair, the attachment of the power means being arranged to create displacement of the links lengthwise relative to one another and to cause a degree of rotation of the bars around the axles of their respective supporting wheels upon operation of the power means.

The invention will be more readily understood from the ensuing description thereof with reference to the accompanying drawings in which.

Figure 1:
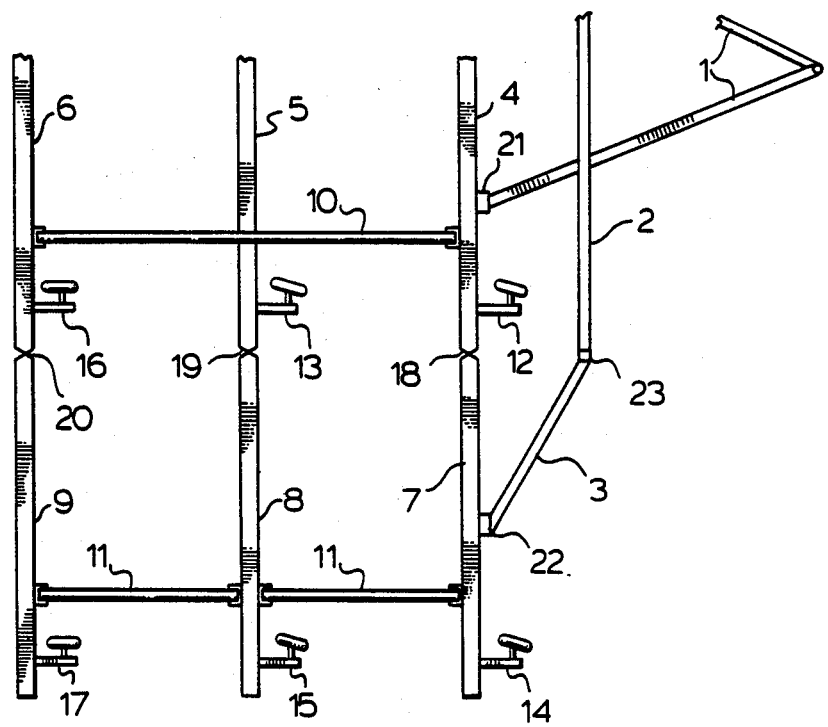
FIG. 1 is a diagrammatic plan view of the right half only of a tractor hitch with three ranks of ground-working tools to be drawn thereby, there being normally three complete sections in each rank, the ranks being in an arrangement in accordance with the present invention.

Referring now to the details of the various figures, in FIG. 1 an "A" frame tractor hitch has legs 1 for connecting a tractor (not shown) to the front of a ground-working implement, and a crossbar 2 extending across the legs. Hitch leg 1 is attached to the front of rigid bar 4 of the center section of the front rank of ground-working tools, at point 21, for example by a clevis with its pin having a horizontal axis transverse to the direction of implement travel. Wing strut 3 is attached at its front end to the end of crossbar 2, at point 23, preferrably for example by a ball and socket connection, or less preferrably by another clevis with its pin axis horizontal but in a line parallel to the direction of implement travel. The back end of wing strut 3 is attached to the front of associated rigid bar 7 of the right wing section of the front rank of ground-working tools at point 22, for example by a ball and socket connection or less preferrably by another clevis with its pin also having a horizontal axis transverse to the direction of travel. Universal joints, shown schematically as 18, 19, and 20 and each including a horizontal and a vertical axis, link rigid bars 4, 5, and 6 respectively of the center sections of the three ranks of ground-working tools with associated rigid bars 7, 8, and 9 respectively of the right wing sections of the three ranks of ground-working tools. Castor mounted wheel units 12 and 14, shown in a right turn position, (and a similar pair of units on the other side of the implement, not shown) are attached to and slightly in front of bars 4 and 7 respectively, and support the center and right wing sections of the front rank of ground-working tools. A similar pair of castor wheel units 13 and 15 are similarly attached to and support bars 5 and 8. Castor mounting of the wheel units, while not essential, facilitates turning of the implement. Fixed wheel units, i.e. non-castoring wheels 16 and 17, are attached to and in front of bars 6 and 9 respectively, and support the center and right wing sections of the rear rank of ground-working tools respectively. The "non-castoring" mounting of the wheels of the rear rank, while not essential, improves the lateral stability of the implement. Parallel link arrangements for the three ranks of ground-working tools are achieved and maintained by links 10 and 11, greater details and operation of which are shown in FIG. 5 and other figures.

Figure 2:
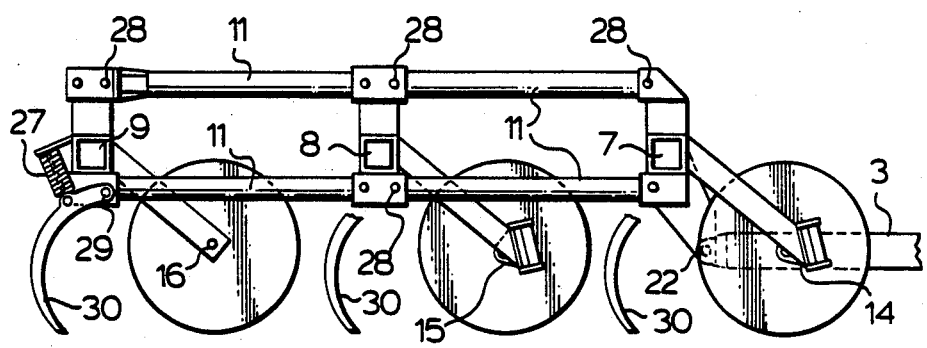
FIG. 2 is a diagrammatic partial side elevation of three ranks of ground-working tools arranged in accordance with the invention.

FIG. 2 is a side view of an apparatus incorporating a parallel link arrangement with the parallel links in the mid-point of their range of adjustment. Wing strut 3 is attached at 22 to, and in front of, bar 7 and similarly, hitch leg 1 is attached to bar 4; these draw the front bars 7 and 4 forward. Bar 7 is free to rotate around point 22 as it passes over undulating ground and is flexibly connected to center bar 8 by rigid links 11; bar 8 in turn is flexibly connected to rear bar 9 by additional parallel rigid links 11. These links form two parallelograms which, in this mid-point position, are substantially rectangles. The parallelograms all have pivot points 28 at each of their four corners so that the angles formed by the links or parallelogram sides can vary from acute, through right angles, to obtuse angles. Preferrably the joints at these pivot points 28 are ball and socket joints, to permit flexibility in the relative movement of the structural members, thus reducing torsion therein, when they are moving over uneven ground. Wheel units 14, 15, and 16 are mounted solidly to and in advance of bars 7, 8, and 9 respectively. Ground-working tools 30 are attached to and beneath the bars 7, 8, and 9 to form the three ranks of ground-working tools. They are mounted in conventional manner with provision to rotate about a pivot, 29, when an obstruction is encountered but otherwise maintained in position by pressure of a spring, 27. The pitch or angle of the bars and their attached ground-working tools is varied and controlled by a pair of hydraulic cylinders, 31 and 32, shown in FIG. 5 only. These cylinders are fastened to and operate on the parallel links 10 in the center sections of the bars (FIG. 1). Greater detail of the operation of the pair of cylinders is given later with reference to FIG. 5.

Figure 3:
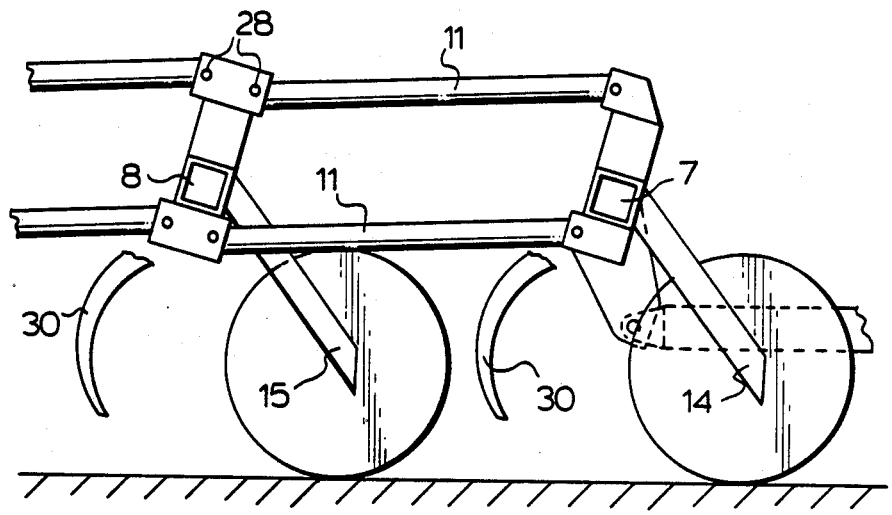
FIG. 3 is a diagrammatic partial side elevation of the two front ranks of FIG. 2, when arranged in position for travel.

FIG. 3 showing only the two front rank bars 7 and 8 carried on wheel units 14 and 15, illustrates the displacement which occurs when the parallel link arrangement 11 has its parallelogram shape varied by operation of an hydraulic cylinder effectively attached diagonally to opposite sides of the parallel link arrangment. Extension of the cylinders 31 and 32 of FIG. 5 causes clockwise rotation of bars 7, 8, and 9 around the axles of the respective wheel units attached directly to and in front of them. Clockwise rotation of the bars around the wheel axles (or variation of the pitch) raises the level of the parallel link arrangement 11, as can be observed by noting how the bottom member 11 in FIG. 3 is at the level of the top of the wheel units 14 and 15, whereas in FIG. 2 this bottom member is distinctly below the top of the wheel circumferences. In this manner the parallel link arrangment raises the elevation of the bars 7, 8, and 9 above the ground, and at the same time raises the ground working tools attached to the bars, thus placing them in position appropriate for transport from one work location to another.

Figure 4:
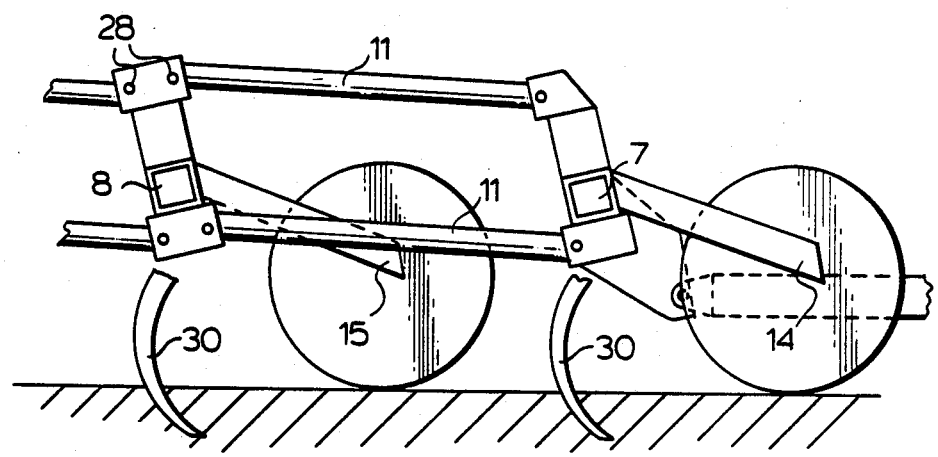
FIG. 4 is a diagrammatic partial side elevation of the same elements shown in FIG. 3, arranged in field working position.
Figure 5:
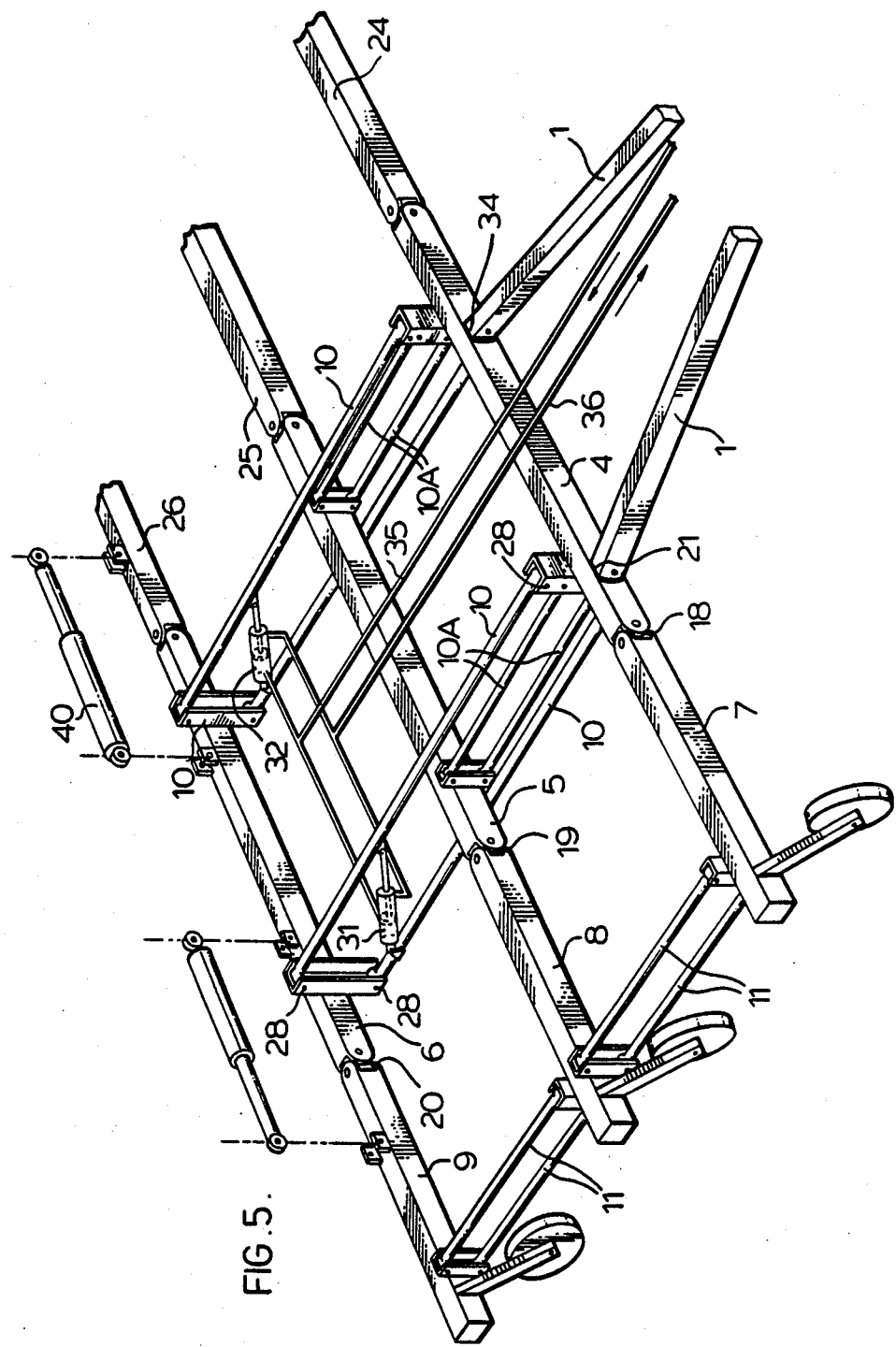
FIG. 5 is a diagrammatic isometric projection, omitting extraneous parts, showing a preferred arrangment of linkages for connecting three ranks of ground-working tools and connections for the power means for operating the linkages. Like reference numbers are used for the corresponding parts throughout the various figures of the drawings.

FIG. 4 illustrates the displacement which occurs when the hydraulic cylinders of FIG. 5 are nearly fully contracted. It will be noted that bars 7 and 8 have rotated counterclockwise around the axles of wheel units 14 and 15 and the bottom member 11 of the parallel link arrangment has moved down almost to the level of the axles of the wheel units. Under this condition, the ground-working tools 30 have been forced into the ground and are in position for their intended purpose, whether it be tilling, cultivating, seeding, distributing fertilizer, or other function.

Referring now to FIG. 5, legs 1 of an "A" frame tractor hitch are indicated as ready for attachment to points 21 and 34 at the front of front rank center section bar 4, of a three rank, three section, ground-working implement. Middle and rear bars 5 and 6 of the center section are flexibly connected to bar 4 by pairs of rigid parallel links 10A and 10 respectively, the links forming parallelograms by their means of attachment to the bars. Associated rigid bars 24, 25, and 26 form the left section of the implement and associated rigid bars 7, 8, and 9 form the right section. As shown in this figure, universal joints 18, 19, and 20 connect the right section bars 7, 8, and 9 to center section bars 4, 5, and 6 respectively. Similar universal joints connect these latter bars to left section bars 24, 25, and 26, as shown. These universal joints permit the outer ends of the right and left section bars to rise and fall independently of any corresponding motion of the center section bars as the equipment travels over uneven ground. Furthermore, by means of lifting mechanisms, for example hydraulic cylinders arranged in the manner of hydraulic cylinder 40 in FIG. 5, the left and right section associated bars (or wing bars) can be pivoted around the points of attachment of these associated bars to their respective center section bars and raised to a vertical position at the ends of the still horizontal center section bars, thereby reducing the width of the moving equipment substantially to that of just the center section and facilitating transport and travel along roadways and through farm gates, as is well appreciated in the art. Hydraulic cylinders 31 and 32, mounted at an angle between the upper and lower rigid parallel links 10, are used to displace these links relative to one another, thus varying the angles at the corners of the parllelograms formed by the links, as discussed above with reference to FIG. 2. The displacement of the parallel links 10 relative to one another produces rotation of the bars 4, 5, and 6 about the axles of the respective wheels in front of and supporting them, and raises or lowers the ground-working tools attached beneath the bars as described with reference to FIGS. 3 and 4. Through universal joints 18, 19, and 20, the displacement of the upper and lower rigid parallel links 10, with respect to one another, creates corresponding proportional displacement of the upper and lower rigid parallel links 11 with respect to one another.

In this manner bars 7, 8, and 9 and also bars 24, 25, and 26, each with their attached ground-working tools, all are rotated around the axles of their respective supporting wheels simultaneously with rotation of bars 4, 5, and 6. Thus all the ground-working tools of the three rank, three section implement can be regulated simultaneously for depth of penetration into the ground by a single and continuously variable control. Hydraulic fluid is fed to the bottom of both cylinders 31 and 32 through a common header 35 to extend them, while fluid is simultaneously removed from the tops of the cylinders by a common header 36. Extending the cylinders varies the pitch to raise the bars and working tools to the transport position. Reversing this flow of fluid causes the cylinders to retract, changing the pitch of the parallel links and lowering the working tools into the ground to the desired depth. The cylinders preferably are sized so that they never have to be completely extended or retracted to obtain the complete range of pitch. The reason for not completely extending or retracting the cylinder is to allow the center section bars to pivot individually, to a limited extent, around the front-to-back center line of the center section. By this is meant that when the various supporting wheels carrying their respective bars encounter undulating terrain, the parallel links are allowed to move; this causes hydraulic fluid to pass back and forth between the bottoms of the two cylinders, and simultaneously between the tops of the two cylinders, without any fluid flowing in or out of the headers. The pitch of the bars is maintained, however, as it is established by the sum of the lengths of the two cylinders.

By having the parallel links 10 extending between the front and back bars 4 and 6 respectively, the pitch of all the bars is directly related to the pitch of the terrain over which the centre section bars 4 and 6, are passing. This established pitch is transferred to middle bar 5 by parallel links 10A. The pitch of the bars of the center section is transmitted to the wing section bars through universal joints, for example 18, 19, and 20 for the right wing, and at the same time parallel links 11 help maintain that pitch in the wing section and the parallel arrangement of the wing section bars. The foregoing arrangment of working tools mounted below parallel bars that are all carried on their own respective wheels mounted ahead of the bars, with the bars maintained in relative position by connection in pairs by parallel links, appear to provide a most adaptable implement.

I claim:

1. A framework for supporting a multiplicity of ground-working tools of an agricultural implement whereby the tools can be positioned relative to the ground, comprising:
   (a) at least two flexibly linked parallel rigid bars beneath which the multiplicity of ground-working tools can be fastened in parallel ranks;
   (b) supporting wheels fastened to said parallel rigid bars with the wheel axles spaced below, ahead of, and generally parallel to the respective bars;
   (c) pairs of parallel rigid links flexibly linking each said parallel rigid bar to another said parallel rigid bar and maintaining all the said bars in generally parallel spaced reltionship, the joints connecting the said parallel rigid links to said parallel rigid bars each being a ball and socket joint; and
   (d) power means mounted adjacent at least one of the pairs of the parallel links, at an angle to and attached to each of the links of the pair, the attachment of the power means being arranged to create displacement of the links lengthwise relative to one another and to cause a degree of rotation of said parallel rigid bars around the axles of their respective supporting wheels upon operation of the power means.

2. A framework as claimed in claim 1 having three of said flexibly linked parallel rigid bars, with two pairs of said rigid parallel links flexibly linking the forwardmost and rearwardmost ones of said three parallel rigid bars to one another near their corresponding ends, and another two pairs of said rigid parallel links flexibly linking the center one of said parallel rigid bars to at least one of the said forwardmost and rearwardmost parallel rigid bars near their corresponding ends.

3. A framework as claimed in claim 2 having as said power means two hydraulic cylinders, each one connected at a diagonal angle between a different one of the pairs of rigid parallel links linking the forwardmost and rearwardmost parallel rigid bars to one another, with two common headers delivering hydraulic fluid respectively to and from both cylinders and enabling fluid to flow between the cylinders without traversing either common header.

4. A framework as claimed in claim 3 in which each of the three parallel rigid bars has attached, at each of its ends by universal joints, additional associated rigid bars, each of said rigid bars adapted to have fastened thereunder ground working tools aligned with those of the corresponding parallel rigid bars and having, at the outer end of each associated rigid bar, a supporting wheel with its axle generally aligned with those of the wheels supporting the corresponding parallel rigid bars, the outer end of each of the associated rigid bars being flexibly linked to that of adjacent ones of said associated rigid bars, through ball and socket joints, by additional pairs of said rigid parallel links which maintain the associated rigid bars in parallel alignment with the corresponding parllel rigid bars.

5. A framework as claimed in claim 4, further including lifting means to pivot said associated rigid bars, around the points of attachment to their respective rigid bars, to a vertical position.

6. A framework as claimed in claim 5 in which the lifting means is a series of hydraulic cylinders, each mounted between a respective one of said three parallel rigid bars and an associated one of said rigid bars attached to one of its ends to lift the associated rigid bar, on operation of the cylinders, from a horizontal position at the end of the respective one of said three parallel bars.

7. A framework as claimed in claim 6, in which the supporting wheels on the rearmost one of said three parallel rigid bars and the associated rigid bars attached to its ends are non-castoring wheels and the supporting wheels on all the remaining bars are castoring wheels.

* * * * *